United States Patent
Denis

[15] 3,678,762
[45] July 25, 1972

[54] BELL GYRO AND METHOD OF MAKING SAME

[72] Inventor: Richard E. Denis, Beverly, Mass.

[73] Assignee: General Motors Corporation, Detroit, Mich.

[22] Filed: Oct. 6, 1969

[21] Appl. No.: 863,857

[52] U.S. Cl. ...................................................... 73/505
[51] Int. Cl. ................................................... G01p 9/04
[58] Field of Search ............................................. 73/505

[56] References Cited

UNITED STATES PATENTS

| | | | |
|---|---|---|---|
| 3,307,409 | 3/1967 | Newton | 73/505 |
| 3,408,872 | 11/1968 | Simmons et al | 73/505 |
| 3,241,377 | 3/1966 | Newton, Jr. | 73/505 UX |

*Primary Examiner*—James J. Gill
*Attorney*—E. W. Christen, A. F. Duke and C. R. Meland

[57] ABSTRACT

A bell-like rotation sensor comprised of a platform base having a post supporting forcer electrodes, a bell-like high-Q member supported by the post and a bore therethrough telescoping the post and forcer electrodes, a platform housing telescoping the outer periphery of the bell and supporting sensor electrodes adjacent thereto. The atmosphere surrounding the bell is evacuated, and the peripheries of the base and housing adjacent the electrodes are relieved to reduce damping on the bell sides. Means are provided for adjusting the azimuth position of the bell sides relative to the forcer electrodes and for locking and sealing the bell to the platform base. The platform housing is adjustable in azimuth relative the bell and platform base and is sealable thereto.

10 Claims, 4 Drawing Figures

INVENTOR
Richard E. Denis
BY
C. L. Meland
ATTORNEY

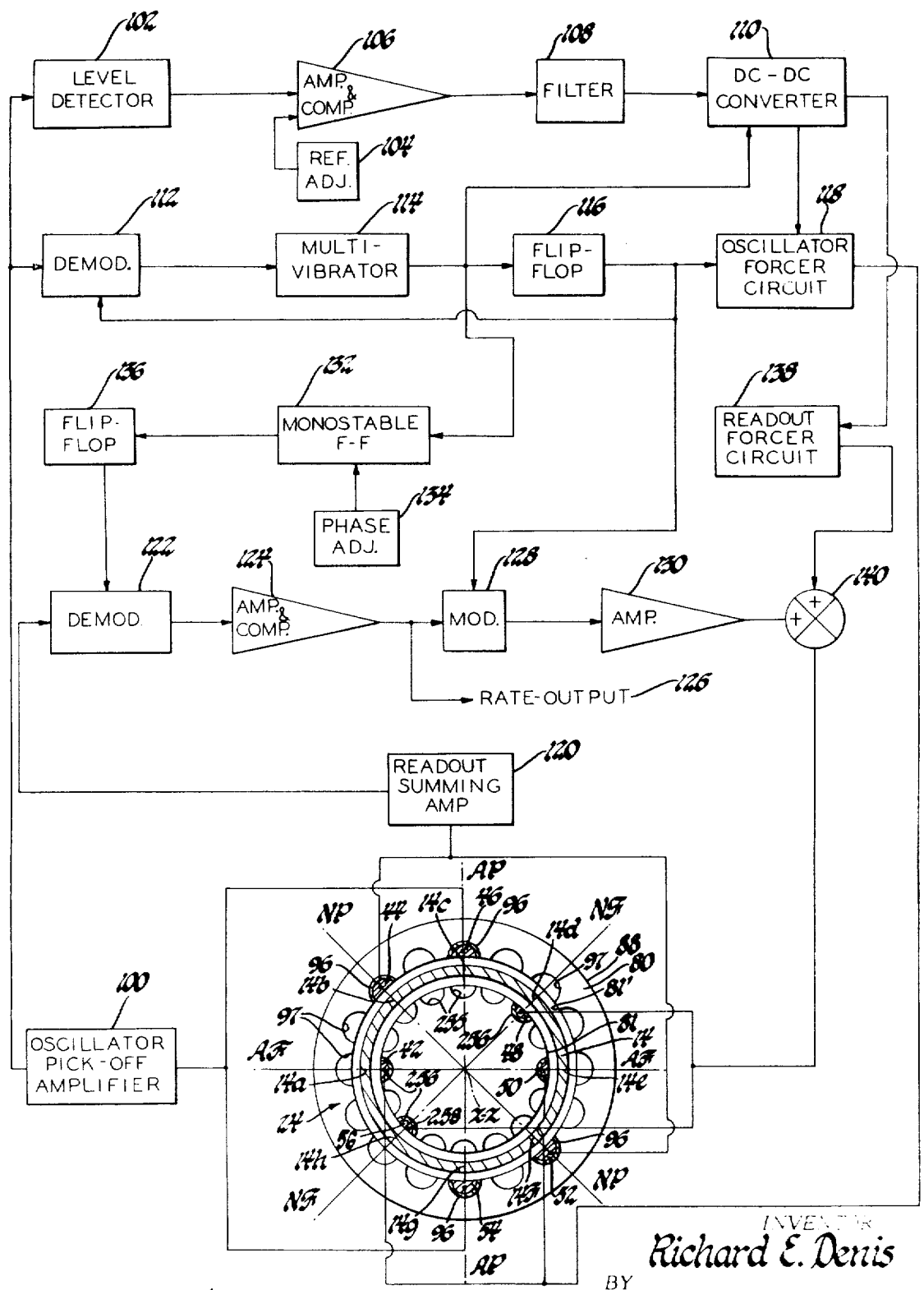

BELL GYRO AND METHOD OF MAKING SAME

This invention relates to an improved device for detecting motion of a platform about an axis by imparting, maintaining, and sensing radial vibrations in a high-Q member capable of sustaining therein a vibration pattern defining nodal and anti-nodal regions when the platform does not rotate. It is particularly directed to such a device applying the method and means described and claimed in U.S. Pat. application, Ser. No. 843,109, entitled "Device for Detecting Rotation about an Axis and Method of Using Same," filed by Alfred G. Emslie on July 18, 1969, incorporated herein by reference, assigned to the same assignee as the present invention, and so arranged that the respective components are so organized as to be relatively free from the errors due to physical misalignment. It is also similar to and an improvement of the apparatus described and claimed in U.S. Pat. application, Ser. No. 863,861 entitled "Bell Gyro and Method of Making Same," filed by Richard E. Denis on Oct. 9, 1969, and also assigned to the same assignee as the present invention.

Several factors affect the sensitivity with which input rotations are detected by a bell-like apparatus having the lip of a high-Q member exercised radially to maintain a vibration pattern having nodal and anti-nodal regions spaced alternately and equi-angularly in the periphery of the lip. For example, circumferential displacement of the forcer or part thereof from an intended anti-nodal lip region might cause the imparted vibration pattern to be rotated from its requisite azimuth orientation. Vibrations would then be detected by a sensor associated with intended nodal lip regions even though the platform does not rotate. Also, misalignment of a sensor from its associated anti-nodal lip region and forming a part of the feedback loop with the forcer might cause errors between the sensed phase and the proper phase of the signal for maintaining self-oscillation. Thus, one factor affecting sensitivity is the degree with which the forcer electrodes are aligned with their associated anti-nodal lip regions. A second factor is the degree with which the sensor electrodes for detecting nodal vibrations when the platform rotates and also the sensors forming part of the feedback loop for self-oscillation of the high-Q member are respectively located at the nodal and anti-nodal regions defined when the platform does not rotate. A third factor is the degree with which relative motion is minimized between the platform and the forcer and sensor electrodes. Even where the angular position of the electrodes and the dimensions of the high-Q member and platform are held to close manufacturing tolerances, these errors can cumulate and cause erroneous sensing of platform rotation by disturbing the variation of sensed output vibrations with the magnitude, frequency, and phase of input rate to the platform.

The factors causing such errors are substantially reduced in the present invention by a rotation detector comprised of structures that are readily adjustable relative to each other and that have tolerances permitting their economical manufacture and assembly. The forcer electrodes are mounted and fabricated in a platform structure separate from that in which the sensor electrodes are mounted and fabricated. These platform structures both secure the electrodes and bell member rigidly with respect to each other and allow them to be positioned in azimuth relative to each other even while the bell member is under low pressure. The structure holding the forcer electrodes is readily aligned about the inner periphery of the bell member so as to impart maximum radial flexing amplitude therein, and the structure holding the sensor electrode is readily aligned about the outer periphery of the bell to provide minimum output in the absence of platform rotation.

In its preferred form, the present invention includes a high-Q bell-like member supported on a base platform by a post and depending therefrom in telescopic relation. The bell-like member has sides flaring arcuately outwards and downwards from its axis and the post axis, terminating adjacent the platform in an annular lip capable of sustaining therein a vibration pattern defining nodal and anti-nodal regions spaced alternatively and equi-angularly thereabout in the absence of platform rotation. Telescoped within the bell-like member and supported therein by the platform and post are four forcer electrodes that impart radial vibrations to the lip of the bell-like member. Four sensor electrodes are mounted in a housing platform that telescopes the bell, forcer electrodes, and post. Electrostatic shielding of the forcer electrodes from the sensor electrodes is effected by the bell sides protruding therebetween.

Acting in pairs, two of the forcer electrodes impart radial vibrations in the lip to establish a vibration pattern defining four nodal regions and four anti-nodal regions in the absence of platform rotation. Two of the sensors detect radial vibrations at two of the anti-nodal regions and develop electrical feedback signals to the first two forcers to generate substantially constant-amplitude natural-frequency radial vibrations at the four anti-nodal regions. Two other sensors detect radial vibrations at one set of such nodal regions thereby detecting rotation or input rate of the platform about the axis, and these nodal sensors develop electrical feedback signals to two other forcers at a second set of nodal regions. Nulling vibrations in phase opposition to those detected by the nodal sensor are thereby affected by the radial forcers.

It is therefore a general object of this invention to provide a device for detecting motion of a platform about an input axis wherein the electrodes for imparting and sensing radial vibrations in a bell-like member capable of substantially-similar low-loss radial vibrations along multiple directions radial to the axis are rigidly mounted in separate platform structures.

It is a further object of this invention to provide a device of the foregoing type wherein the azimuth adjustment of the bell sides relative the forcers imparting vibrations and azimuth adjustment of the sensors detecting vibrations are made separately even while the bell is enclosed in a predetermined atmosphere.

It is a further object of the present invention to provide electrodes for imparting and sensing vibrations in a bell-like high-Q member wherein some electrodes are mounted adjacent the inner periphery of the bell sides and others are adjacent the outer periphery, the sides also shielding the inner electrodes from the outer mounted electrodes.

It is another objective to provide a method for angularly locating, securing, isolating, and contouring electrodes for imparting, maintaining, sensing, and nulling low-loss radial vibrations in a bell member relative to an axis of symmetry through the member.

It is a further and more limited object to provide an apparatus for detecting rotations of a platform wherein the effective Q and other vibrational characteristics of the vibrating member can be controlled by varying atmosphere and the peripheries of the electrode mounting structures adjacent the bell sides.

It is a further and more specific object of the present invention to provide an apparatus to measure rotation of a platform about an axis which embodies features of construction, combination, and arrangement that facilitates manufacture with a high degree of accuracy through the use of turning techniques, that permits rotational adjustment of the vibrating bell-like member in relation to the forcer and sensor electrodes to provide maximum detector sensitivity, that defines a rigid structure that resists vibration, that accommodates a dual forcer and sensor arrangement and apparatus which diminish alignment errors and their effects, and that in other respects achieves an apparatus that is inexpensive in construction and yet is reliable and accurate in operation.

The invention embodies other novel features, details of which are hereinafter set forth in the specification and claims and illustrated in the accompanying drawings, wherein:

FIG. 4 is a reduced-scale section through the detector showing the peripheries of the base and housing and block diagram means whereby the bell-like member may be operated to indicate rotation about an axis.

DETAILED DESCRIPTION — FIG. 1

Figure 1:
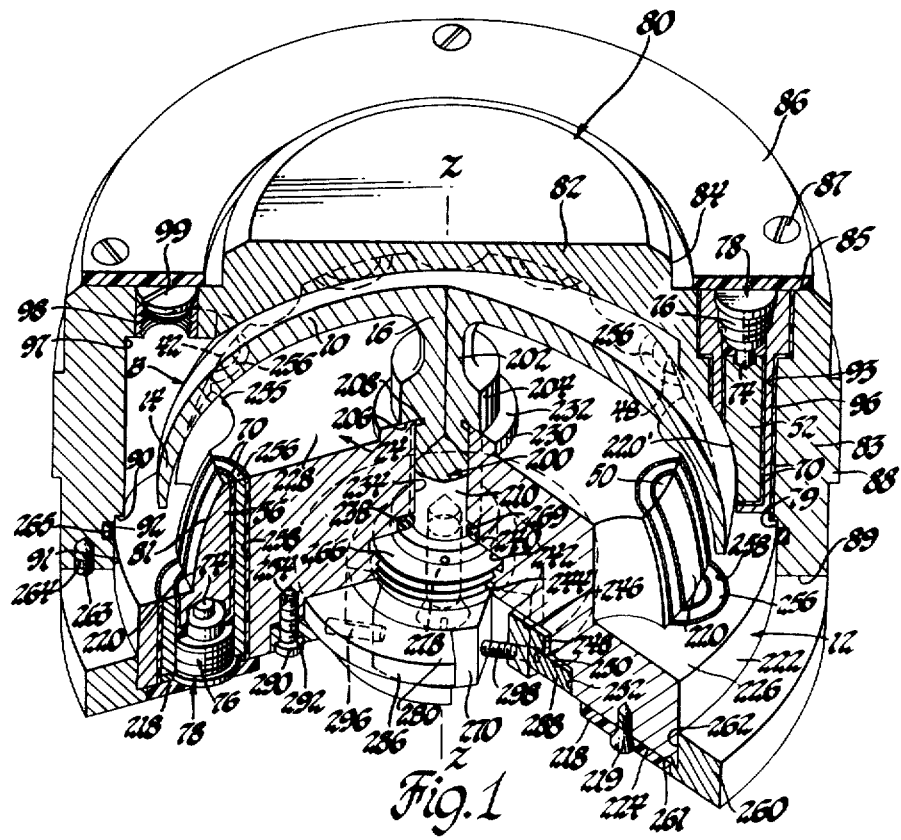
FIG. 1 is a view, with parts partially broken away of a rotation detector made in accordance with the invention showing a platform base and housing with the housing carrying sensor electrodes and with the base supporting a bell-like member and forcer electrodes within the confines of the bell.

As may be seen with reference to FIG. 1, bell B is supported in an inverted position on post 24 upstanding from platform base 12 and is enclosed thereon by platform housing 80.

Bell B is comprised of arcuate sides 10 that depend contiguously and symmetrically from central area 16 about a shaft 200 along the Z—Z polar or input axis and that terminate in an arcuate lip 14. In order of progression from center region 16, shaft 200 is comprised of a neck portion 202, a hub section 204 having a lower hub surface 206, a relief groove 208, an axially-extending stem 210, and a terminating square end 212 having a threaded portion 214 therein.

Platform base 12 has an outer surface 222 bounded by a floor 224 and a ledge 226. A circuit board 218 is secured to floor 224 by screws 219 and a post 24 upstands from ledge 226 along the Z—Z axis. Post 24 is comprised of a roof 228 carrying a hub 230 having an upper hub surface 232 and a bore 234 therethrough concentric with the Z—Z polar axis. Also concentric therewith and counterbored in bore 234 are seats and sides 238-240, 242-244, 246-248, and 250-252, respectively. Eight holes 254 are threaded into counterbored seat 250 about the Z—Z polar axis, and, as may be seen more clearly in conjunction with FIG. 4, to reduce damping between post 24 and the inner periphery of lip 14, 12 axial openings 255 are located about the perimeter of post 24 equi-radially about the Z—Z axis commencing at roof 228 and terminating at ledge 226.

Four conductive brass guard sleeves 256 and forcer electrodes 42, 48, 50, and 56 are secured by epoxy 70 respectively in four spaces 258. These spaces extend equi-radially with openings 255 from roof 228 to ledge 226 and project axially through base 12 from ledge 226 to floor 224. The outer periphery of base 12 at surface 222 as well as the radially outwardly facing portions of sleeves 256, electrodes 42, 48, 50, and 56 and epoxy 70 are contoured to provide an arcuate surface 81 to receive the inner surface of bell lip 14 in close spaced relation therefrom upon assembly therewith. Having axially-open portions facing radially outwards from the Z—Z axis towards lip 14, sleeves 256 expose just the faces 220 of the electrodes 42, 48, 50, and 56 to the inner periphery of lip 14. To electrically isolate electrodes from platform 12 elsewhere and to isolate the guard sleeves from the electrodes, epoxy 70 is inserted in the 0.01 inch spaces between the guard sleeve 256 and spaces 258 and also between the sleeves and the electrodes.

Feedthrough connector 78 comprised of a probe 74 and an electrically-isolated guard sleeve 76 is threaded into each guard sleeve 256 so that connector probe tip 74 is in pressure contact with the electrode held within the sleeve and so that connector guard 76 terminates at electrode guard sleeve 256 short of the electrode.

Figure 2:
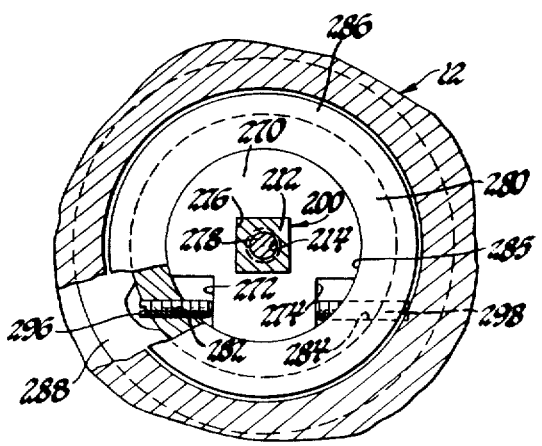
FIG. 2 is a view of a partial section through the platform base showing means for adjusting the bell member in azimuth relation to the platform base.

Bell B is secured to platform post 24 by means of lug ring 270 having lug surfaces 272 and 274 extending off-center of polar axis Z—Z and a centrally located square key 276 to receive square shaft end 212, more clearly shown in FIG. 2. A screw 278 is inserted into threaded hole 214 of square shaft end 212 to urge lug ring 270 against base counterbore seat 246 thereby urging lower hub surface 206 of bell hub 204 squarely against upper hub surface 232 of post hub 230. Screw guide 280 having off-center holes 282 and 284 threaded therethrough and an inner surface 285 bounding lug ring 270 also has an outer flange 286 that is urged against counterbored seat 246 by clamp ring 288. Screws 290 threaded into holes 254 of counterbore seat 250 secure clamp ring 288 to base 12 through clamp ring holes 292. Azimuth positioning screws 296 and 298 are threaded into holes 282 and 284 of screw guide 280 to terminate at lug surfaces 272 and 274, respectively.

Housing platform 80 is comprised of an end wall or roof 82 and cylindrical side walls 83. Roof 82 has a central hub 84 and a surface 85 recessed thereabout to receive a circuit board 86 secured thereto by screws 87. Side walls 83 terminate in edge 89, having a clamping flange 88 on their outer periphery, and on their inner periphery have a counterbored seat 90 and side 91, the latter having O-ring groove 92 therein. Four guards 96 and sensor electrodes 44, 46, 52, and 54 are secured by 0.01 inch layers of epoxy 70 in four spaces 93 that protrude axially and equi-radially about the Z—Z axis into walls 83 from roof 85.

Guards 96 have axially-open portions facing radially inwards to expose just sensor faces 220' to the outer periphery of lip 14 and terminate at end 79. Elsewhere, the guards, electrodes, and housing are isolated from each other by epoxy 70. The inner periphery of walls 83 and portions of sleeves 96 and end 79 as well as electrodes 44, 46, 52, and 54 and epoxy 70 are removed to provide an arcuate surface 81' to receive the outer periphery of bell lip 14 in close spaced relationship therefrom upon assembly. As may be seen more clearly in conjunction with FIG. 4, to reduce damping between housing 80 and the outer periphery of lip 14, 12 axial openings 97 protrude into walls 83 equi-radial with spaces 93 and terminating short of roof 85. A port 98 coaxial with an opening 97 extends through surface 85 and is sealed by plug 99 after the apparatus has been assembled and evacuated.

A feedthrough connector 78 is screwed into each sleeve 96 so that the connector probe tips 74 are in pressure contact with the electrodes and the connector guards 76 are in contact with and terminate at the guard sleeves 96 short of the electrodes. Signals developed on probe tips 74 and guards 76 of connectors 78 are brought out thereby to circuit board 218 in base 12 and board 86 in housing 80. These circuit boards carry suitable pads for connection with probes 74 and guards 76 of connectors 78 and also carry suitable circuit paths and elements for interconnecting the electrodes and operating the rotation detector as to be more fully described below with reference to FIG. 4. MOreover, being electrically-isolated and physcially-separated by epoxy 70 from housing 80 and the electrodes, the guards around the sensor electrodes are maintained electrically by these circuits at substantially the same potential as these electrodes to provide a constant capacitance cage thereabout, thereby enhancing the sensitivity of the sensors to radial lip vibrations.

The platform structures and especially bell B are made from a high-Q or low-loss material. By high-Q, I refer to the ratio of the energy stored in the oscillating system to the energy dissipated in one cycle. Materials that exhibit favorable Q's, elastic limits, and modulus of elasticity, and yet are readily machinable, include aluminum alloys, such as 2024-T4. This alloy has a composition generally of 93.4 percent aluminum, 4.5 percent copper, 1.5 percent magnesium, and 0.6 percent manganese. Also, silicon-aluminum bronze or "Everdur" alloys, having 96 percent copper, 3 percent silicon, and 1 percent manganese or 91 percent copper, 7 percent aluminum and 2 percent silicon have favorable properties.

Thus, bell B shown in FIG. 1, is preferably constructed from 2024-T4 aluminum having a modulus of elasticity E of $10.6 \times 10^6$ psi and a Q of 3,000 in air, 3,100 in helium and up to 12,000 in $10^{-3}$ torr vacuum. The inner and outer peripheries of sides 10 both have a mean radius of 1 inch swung at different points along the Z—Z axis and vary in thickness in the arcuate region from maximum $h_o$ of 0.20 inches in the center region 16 to some finite thickness $h$ in accordance with the formula $h \times h_o(1 + \cos\theta)^2/4$, where $\theta$ is the spherical angle subtended from the polar axis through center 16. This thickness contour is believed to provide surfaces of uniform maximum strain when flexed. When assembled to platforms 12 and 80, lip 14 clears the arcuate faces of the sensor and forcer electrodes by nominally 0.005 inches.

The feedthrough connectors 78 are "Microdot" connector CD-051-007 available from Microdot Incorporated of South Pasedena, California. Potting adhesive or epoxy 70 may, for example, be that known as "P38" obtainable from Bacon Industries of Watertown, Massachusetts. This adhesive is an epoxy resin-base compound chosen because of the stability of its composition and dimensions with time and temperature and its high dielectric strength. Moreover, such epoxy has high adhesion, low tendency to crack, low coefficient of linear thermal expansion, low creep, and high tensile strength.

Base platform 12 carrying bell B fastened thereto is assembled and rigidly secured to housing platform 80 by clamp ring 260 having a counterbored seat 261 and side 262. Clamp ring 260 is fastened to housing platform 80 at edge 89 thereof by eight screws 263 threaded into holes 264. As the screws 263 are tightened, counterbored seat 261 of ring 260 urges bottom surface 224 of base platform 12 and ledge 226 towards seat 90 counterbored in the inner periphery of housing side 83, and base surface 222 slides axially along counterbore side 91. Side 91 having a radial gap of 0.001 inch from surface 222 centers the latter coarsely therewith, fine centering and sealing therebetween being effected by O-ring 265 in groove 92.

Prior to the final tightening of screws 263, the atmosphere internal to platforms 12 and 80 is evacuated as desired to effect a high-Q for bell B and the relative azimuth positions of the bell B, platform base 12, and platform housing 80 are adjusted as will be explained more fully below. Air may thus be withdrawn from housing 80 through port 98 and the atmosphere therein backfilled with another gas such as helium so as to increase the Q of the bell by decreasing air damping. For instance, it has been found that by maintaining the bell vacuum on the order of $10^{-2}$ torrs increases the Q of the device fourfold and hence comparably increases the time constant, or ringing time, of oscillations in relation to the energy input per cycle.

To allow azimuth adjustment of platform 12 relative housing 80 and yet preserve the evacuated environment, port 98 is sealed by plug 99 and annular periphery 222 of platform 12 is sealed against side 91 counterbored in housing side 83 by O-ring 265 located in groove 92 of side 91. A seal between surfaces 91 and 222 is thereby effected to be slidable in azimuth about polar axis Z—Z as the position of bell B carried by base 12 is adjusted relative to the sensor electrodes carried by housing 80. Moreover, to allow similar sealed adjustment of bell B relative to base 12, shaft stem 210 of bell B is sealed against bore 234 through post 24 by O-ring 269 urged against counterbored seat 238 and side 240 by plug 266 threaded into counterbored side 244. A seal between stem 210 and bore 234 is thereby effected to be slidable about the Z—Z axis as the position of bell B is adjusted relative to the forcer electrodes carried by base 12.

Thus, a primary feature of the rotation detector as shown in FIG. 1 is the flexibility with which the azimuth position of the bell B, forcer electrodes, and sensor electrodes may be adjusted relative to each other. The azimuth position of bell sides 14 may be adjusted separately with respect to the forcer electrodes or the sensor electrodes. Moreover, such positioning may be done before or after the vacuum or backfilled gas is applied. This positioning is initiated by rotating lug ring 270 about the Z—Z axis to also rotate thereabout bell B keyed to ring 270 at square shaft end 212 in square hole 276 and by rotating base platform 12 relative to housing platform 80. Coarse maximization of the flexing amplitude imparted by forcer electrodes 42 and 50 to lip 14 is effected by simply turning lug ring 270 in azimuth about axis Z—Z until maximum signals are observed as developed by sensor electrodes 44 and 52 sensing vibrations at the anti-nodal lip regions. After such coarse adjustment, screws 290 are tightened through holes 292 in clamp ring 288 into holes 254 threaded into counterbored seat 250. This secures screw guide 280 against counterbored seat 246 and allows fine flexing maximization and positioning by adjusting screws 296 and 298 to urge lug surfaces 272 and 274 in azimuth about the Z—Z axis.

After the anti-nodal lip regions are so positioned relative to forcer electrodes 42 and 50 carried by base 12, the position of readout sensor electrodes 44 and 52 carried by housing 80 is adjusted relative the lip nodal regions so as to minimize the signals developed in the absence of platform rotation. This is accomplished by fastening clamp ring 88 of housing 80 to a support structure and rotating the base 12 with the bell positioned and secured thereto until minimum signals are observed developed by electrodes 44 and 52. At this point screws 263 are tightened through clamp ring 260 to lock base 12 to housing 80 in the desired azimuth position.

In addition to flexibility, other important benefits also obtain from such separate positioning. First, detector sensitivity is increased by affording a maximum flexing amplitude and thus maximum momentum to interact with the Coriolis effect of platform rotation. Secondly, since this maximum flexing is obtained by averaging the effects of two forcer electrodes, the azimuth positioning of these electrodes with respect to each other and also with respect to other detector elements is made less critical. Thirdly, the readout signal-to-noise ratio is maximized, and since this is also obtained by averaging the effects of two sensor electrodes, their azimuth positioning is made less critical. Fourthly, by eliminating some manufacturing tolerances in each structure that might otherwise be required if not separately adjustable, the producibility of not only platforms 12 and 80 but also bell B is enhanced. Tolerances on electrode positioning, the curvature and uniformity of the bell sides 14, and the concentricity of shaft stem 210 relative to the desired polar axis Z—Z are thereby made sufficiently ample to allow ready manufacture by conventional machining techniques. Finally, instrument performance is enhanced by making adjustments while the bell B is exposed to the environment in which it is to operate.

Figure 3:
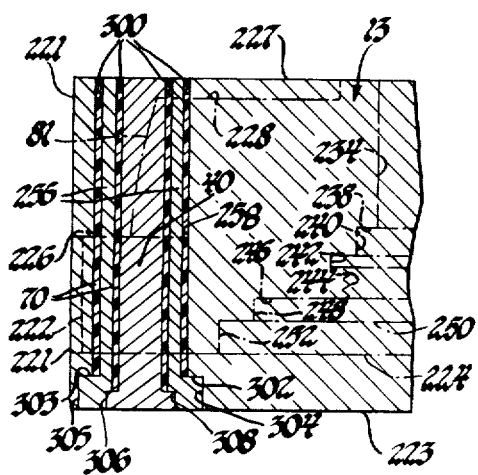
FIG. 3 is a view through a cross section of an electrode assembly and base platform before machining, suggesting a method of making the same.

Another feature of the rotation sensor shown in FIG. 1 is the ready and accurate fabrication of electrodes and their guards integrally with their supporting platform structures. The processing of these platforms and electrodes may be better understood with reference to the cross section of an electrode assembly and platform shown in FIG. 3, wherein the final configuration is shown by dotted lines and referenced with designations as used in FIG. 1. Starting with a rough platform 13 having outer surface 221 bounded by floor 223 and roof 227 such surfaces being greater than the final surfaces 222, 224, and 226 as shown, spaces 258 are drilled through platform 13 equi-radially about and parallel to the Z—Z polar axis from roof 227 to floor 223. Seats 302 and sides 304 are then counterbored into spaces 258 from floor 223 to terminate short of final floor 224 as shown.

A brass guard sleeve 256 terminating in flanged seat 303 and side 305 is inserted into space 258 to mate with counterbored seat 302 and side 304. Flanged seat 303 locates sleeve 256 axially in space 258 while flange side 305 locates the sleeve radially so as to have a 0.01 inch radial clearance from space 258 about the sleeve periphery between floor 224 and roof 228. A rod of electrode material 40 terminating at one end in a flanged side 306 is thereafter inserted from floor 223 into each sleeve 256 so that side 306 centers rod 40 to have a 0.01 inch clearance about the inner diameter 308 of the sleeve between floor 224 and roof 228 as shown. To assure that spaces 258, sleeves 256, and rods 40 do not contact each other along the axial space from floor 224 to roof 228, these elements are also separated from each other radially by cement spots 300 located between rough roof 227 and final roof 228. Epoxy 70 is then inserted into the spaces between the rough platform 13, sleeves 256, and rods 40 to envelope the adjacent surfaces of these elements and upon curing adhere them to each other.

So bonded, the guards, rods, and platform form a rigid unitary whole. The structure is then held on its outer periphery 221 to allow machining of bores 234, 242, 244, 248, and 252 and counterbores 240, 246, and 250. Rough platform 13 is then mounted on centers along the Z—Z axis to allow the machining of periphery 222, flow 224, ledge 226, and roof 228. Finally, axial portions of rough platform 13, guard sleeve 256, rod 40, and epoxy 70 are machined off between ledge 226 and roof 228 to provide an exposed arcuate surface 81 cutting thereacross concentric with and symmetrical about the Z—Z polar axis and providing rods 40 with a face 220 facing bell lip 14.

GENERAL OPERATION

The general operation and interconnection of a self-oscillator loop and readout loop for respectively effecting vibration and detecting rotations in the present invention may be understood with reference to FIG. 4. Therein the means comprising the self-oscillation and readout loops are shown interconnected in block form with the electrode assembly shown in plan view using like designators for similar elements in FIG. 1. A more detailed description of circuits for effecting these loops may be found in copending application, Ser. No. 864,109 titled "Bell Gyro and Improved Means for Operating Same," filed by David L. Lynch on Oct. 6, 1969, and assigned to the same assignee as the assignee of this application. Operation of bell B requires that sides 10 be exercised or forced radially so as to flex lip 14 and establish therein a standing wave pattern defining nodal regions of normally quiescent radial vibrations and anti-nodal regions of normally maximum radial vibrations. Such flexing is initiated and sustained by an electro-mechanical self-oscillation loop comprised generally of forcer, sensor, and feedback means located operatively about the sides of the bell, the bell in turn being connected to source of constant potential such as ground or otherwise. The forcers are energized at a potential varying at the natural frequency of the bell to vary the potential difference between the sides and forcers creating therebetween a varying electrostatic force of attraction. This attractive force flexes lip 14 in a pattern having a set of anti-nodes along each of two mutually perpendicular directions radial to the input or polar axis Z—Z and a set of nodes along each of two mutually perpendicular directions midway between those associated with the anti-nodes.

Deflections of the lip are detected by the sensors located adjacent thereto and measuring either the varying capacitance or varying potential therebetween depending on the input impedances of the circuit connected with the sensors. First sensor means detect the amplitude of vibrations of lip 14 anti-nodes, and the electrical feedback means connecting sensor to the forcer close a loop operative to flex the anti-nodal lip regions at constant maximum amplitude. Other sensor means detect those radial vibrations at a nodal region due to the motion of the lip associated with the standing wave pattern and rotation of the bell about its input axis, such nodal vibrations believed to be due to the effect of Coriolis forces.

In FIG. 4, the self-oscillator loop is comprised generally of lip regions 14c and 14g of bell B, electrodes 46 and 54, oscillator pickoff amplifier 100, level detector 102, amplifier 106, filter 108, dc-to-dc converter 110, demodulator 112, multivibrator 114, flip-flop 116, oscillator forcer circuit 118, electrodes 42 and 50, and lip regions 14a and 14e. Electrodes 42 and 50 are oscillator forcer electrodes connected in parallel to oscillator forcer circuit 118 and operative to impart radial exercising vibrations to bell B by applying varying attractive potential at lip regions 14a and 14e along an anti-nodal forcing axis AF—AF normal to the polar or input axis Z—Z. Electrodes 46 and 54 are oscillator pickoff electrodes connected in parallel to oscillator pickoff amplifier 100 and operative to detect radial vibrations of bell B by measuring the varying potential at lip regions 14c and 14g along an anti-nodal pickoff axis AP—AP normal to both the AF—AF and Z—Z axes.

The output of oscillator pickoff amplifier 100 is connected parallely both to level detector 102 and to demodulator 112, to a source of adjustable reference potential 104 connected to the input of level detector 102, the output of which is connected to dc-to-dc converter 110 through amplifier and compensator 106 and filter 108 to regulate the amplitude of the exercising wave. Demodulator 112 is connected to multivibrator 114 and therefrom to both converter 110 and to frequency dividing flip-flop 116. Synchronization pulses are provided by flip-flop 116 back to demodulator 112, to oscillator forcer circuit 118, and also to chopping modulator 128 in the readout loop. The output of modulator 112 regulates the frequency of multivibrator 114 driving frequency dividing flip-flop 116, which in turn slaves at substantially the resonant frequency of lip 14 both the frequency of demodulator 112 and the frequency with which oscillator driver 118 applies a forcing potential to electrodes 42 and 50.

At start-up, the difference in amplitude between reference potential 104 and the signal from amplifier 100 corresponding to the maximum amplitude of lip 14 at regions 14c and 14g is of sufficient magnitude and a polarity to cause an output from dc-to-dc converter 110 to oscillator forcer circuit 118. The amplitude and frequency of the varying potential to oscillator forcer electrodes 42 and 50 and lip regions 14a and 14e therefore tends to increase the amplitude of lip vibrations. As the amplitude of lip vibrations increase, the input to detector 102 increases the difference from that provided by reference 104. The output from level detector 102 to converter 110 consequently increases to ultimately stabilize at a value corresponding to a substantially constant maximum amplitude of lip variation, such amplitude being adjustable by setting reference potential 104.

Free running multivibrator 114 is biased at startup to operate converter 110 and to cause the output from frequency divider 116 to oscillator forcer circuit 118 to be less than the resonant frequency of lip 14. Thereafter, the bias to multivibrator 114 is adjusted by the output of demodulator 112 to effect a frequency which produces a maximum amplitude at lip 14 for the converter-regulated forcing potential. The output of multivibrator 114 is also applied to monostable vibrator 132, wherein the pulses from 114 are phase shifted by adjustment means 134 and then applied to demodulator 122 after frequency division by flip-flop 136.

The readout loop is comprised generally of lip regions 14b and 14f of bell B, readout pickoff electrodes 44 and 52, readout summing amplifier 120, demodulator 122, phase shifting monostable vibrator 132, frequency dividing flip-flop 136, compensator amplifier 124, chopping modulator 128, amplifier 130, readout forcer circuits 138, readout forcer electrodes 48 and 56, and back to lip 14 at regions 14d and 14h.

Electrodes 44 and 52 are readout pickoff electrodes connected in parallel to readout summing amplifier 120 and operative to detect radial vibrations of bell B by measuring the varying potential at lip regions 14b and 14f along a nodal pickoff axis NP—NP between AF—AF and AP—AP axes. Similarly, electrodes 46 and 56 are readout forcer electrodes connected in parallel to amplifier 130 and readout forcer circuit 138 and operative to impart radial vibrations of proper frequency and amplitude to bell B by applying varying attractive potential at lip regions 14a and 14b along nodal forcing axis NF—NF between the AP—AP axes and normal to the NP—NP axis to null the vibrations sensed by readout pickoff electrodes 44 and 52.

The output of readout pickoff amplifier 120 is connected to demodulator 122, the output of which after amplification and compensation in amplifier 124 provides a signal at 126 proportional to the rate of rotation of bell B about axis of symmetry Z—Z. Signal 126 may also be used to energize means (not shown) generating pulses that can be counted to indicate the amount of rotation about axis Z—Z over a given period of time, thereby indicating angular displacement of bell B about axis Z—Z.

The output of amplifier 124 is also chopped or modulated in the present embodiment at a frequency determined by the output of flip-flop 116 to provide a varying potential from amplifier 130 that is summed at 140 with a regulated dc potential from readout forcer circuit 138 energized by the output of dc-to-dc converter 110. The forcing potential subsequently applied to electrodes 48 and 56 is a dc bias that is augmented by a potential having an amplitude proportional to the input rate, a frequency determined by multivibrator 114 and flip-flop 116 to be substantially the resonant frequency of lip 14, and a phase of 180° opposite to the vibration of lip regions 14b and 14f.

Having described one embodiment of the invention, it is understood that the specific terms and examples are employed in a descriptive sense and not for the purpose of limitation. Thus, the electrodes could be made of 2024–T4 aluminum or other conductive electrode materials, and the base and housing could be made from non-conductive materials, thereby diminishing or even eliminating the need for guards. Moreover, the adjustment features of this invention may be adapted to other structures. These include, for example, those wherein the bell is supported by the housing and may be sealably positioned therein and thereby relative to electrodes supported by the housing and base or those wherein all the electrodes are fixed to the base or housing such as described in the above cited Denis application.

It will be obvious to those skilled in the art that modifications and changes may be made without departing from my invention and that the subject invention has application wherever it is desired to detect motion of a structure about an axis. Applications where the device may be used include those to indicate horizontal and vertical directions, to provide a strapped-down or gimballed reference platform, to stabilize a structure against external motions, or to navigate a vehicle over desired course.

I, therefore, aim in the appended claims to cover such modifications and changes as fall within the true spirit and scope of my invention.

What I claim as new and desire to secure by letters of patent of the United States is:

1. In an apparatus for detecting motion of a platform about an axis:
   a. a base having a floor and a post upstanding therefrom along said axis;
   b. a housing including an end wall and a side wall depending therefrom about said post and axis and secured to said floor, whereby said base and housing form a rigid platform;
   c. a first electrode secured to and forming a rigid integral structure with said post and having a face concentric about said axis, and a second electrode secured to said housing;
   d. a bell-like conductive unit having a center region supported by said platform along said axis and sides flaring outwards therefrom over said post and capable of high-Q radial vibration, said sides disposed between said first and second electrodes;
   e. first circuit means connected to one of said electrodes and operative to develop a varying potential difference between said electrode and said side to establish therein a vibration pattern defining nodal and anti-nodal regions when the platform does not rotate; and
   f. second circuit means connected to the other of said electrodes located at a said nodal region, said second circuit operative to develop signals varying with the radial vibrations of said side at a said nodal region produced thereat by the effects of said vibration pattern and the rotation of said platform about said axis.

2. In an apparatus for detecting motion of a device about an axis comprising:
   a. a housing comprised of first and second housing parts which when connected together form an enclosure;
   b. a bell-like conductive member having a center region fixed to one of said housing parts along said axis and sides flaring outwards therefrom and capable of high-Q radial vibration;
   c. at least two electrode means supported by the other housing part and disposed closely adjacent said sides of said bell-like unit, one of said electrode means operative to impart a radial vibration pattern to said sides defining nodal and anti-nodal regions when said housing does not rotate about said axis, the other of said electrode means located at a said nodal region and operative to develop signals varying with the radial vibrations of said side of said bell; and
   d. means for rigidly securing said first and second housing parts together to define an enclosure which contains said bell-like member, said last named means including means permitting adjustment of one of said housing parts relative to the other about said axis and a sealing means engageable with said first and second housing parts for maintaining said enclosure substantially airtight during adjustment of one of said housing parts relative to the other.

3. In an apparatus for detecting motion of a platform about an axis:
   a. a base member;
   b. a housing member including an end wall and a side wall depending therefrom, said side wall located about said axis and secured to said base;
   c. at least two electrodes secured to one of said members;
   d. a bell-like conductive unit having a center region, a shaft depending therefrom and rotatably supported by the other of said members along said axis, and sides flaring outwards therefrom and capable of high-Q radial vibration, said sides defining a periphery located adjacent said electrodes;
   e. first means adjustably securing said housing to said base permitting rotation therebetween about said axis and thereafter forming a rigid platform of said housing and base, and second means operatively connected to said shaft and said other of said members for rotating said sides relative to said electrodes about said axis and for thereafter securing said bell unit to said other member;
   f. first circuit means connected to one of said electrodes and operative to develop a varying potential difference between said electrode and said side to establish therein a vibration pattern defining nodal and anti-nodal regions when the platform does not rotate; and
   g. second circuit means connected to the other of said electrodes located at a said nodal region, said second circuit operative to develop signals varying with the radial vibrations of said side produced at a said nodal region thereof by the effects of said vibration pattern and the rotation of said platform about said axis.

4. In the apparatus of claim 3, first sealing means disposed between said base and said housing permitting rotation therebetween about said axis, and second sealing means disposed between said shaft and said other member permitting rotation therebetween about said axis.

5. In an apparatus for detecting motion of a platform about an axis:
   a. a base having a floor and a post member upstanding therefrom along said axis;
   b. a housing member including an end wall and a side wall depending therefrom about said post member and axis and secured to said floor, whereby said base and housing member form a rigid platform;
   c. one electrode secured to said post member and another electrode secured to said housing member;
   d. a bell-like conductive unit having a center region, a shaft depending therefrom and rotatably supported by one of said members along said axis, and sides flaring outwards therefrom over said post member and capable of high-Q radial vibration, said sides disposed between said electrodes;
   e. means operatively connected to said shaft for adjusting said sides relative to said members;
   f. first circuit means connected to one of said electrodes and operative to develop a varying potential difference between said electrodes and said side to establish therein a vibration pattern defining nodal and anti-nodal regions when the platform does not rotate; and g. second circuit means connected to the other of said electrodes located at a said nodal region, said second circuit operative to develop signals varying with the radial vibrations of said side at a said nodal region produced thereat by the effects of said vibration pattern and the rotation of said platform about said axis.

6. In an apparatus for detecting motion of a platform about an axis:
a. a base having a floor and a post member upstanding therefrom along said axis;
b. a housing member including an end wall and a side wall depending therefrom about said post member and axis and secured to said floor, whereby said base and housing form a rigid platform;
c. means securing said side wall member to said floor permitting relative rotation therebetween about said axis and thereafter forming a rigid platform of said housing member and base;
d. one electrode secured to said post member and another electrode secured to said housing member;
e. a bell-like conductive unit having a center region, a shaft depending therefrom and rotatably supported by one of said members along said axis, and sides flaring outwards therefrom over said post member and capable of high-Q radial vibration, said sides disposed between said post member and side wall and defining a periphery located adjacent said electrodes;
f. means operatively connected to said shaft permitting adjustment between said side and said members relative to said axis;
g. first circuit means connected to one of said electrodes and operative to develop a varying potential difference between said electrodes and said side to establish therein a vibration pattern defining nodal and anti-nodal regions when the platform does not rotate; and
h. second circuit means connected to the other of said electrodes located at a said nodal region, said second circuit operative to develop signals varying with the radial vibrations of said side produced at a said nodal region thereof by the effects of said vibration pattern and rotation of said platform about said axis.

7. In the apparatus of claim 6, first sealing means disposed between said floor and said side wall permitting adjustment therebetween relative to said axis, and second sealing means disposed between said shaft and said one member permitting adjustment between said sides and said members relative to said axis, whereby said adjustments may be made while a predetermined atmosphere is contained by said platform.

8. In an apparatus for detecting motion of a platform about an axis:
a. a base including a post having a bore therethrough along said axis and defining at least one space formed therein located parallel to and radial from said axis, said space having an opening facing radially from said axis;
b. a housing comprised of an end wall and a side wall extending therefrom and defining at least one space formed therein located parallel to and radial from said axis, said space having an opening facing radially towards said axis, said side wall located about said axis and post and secured to said base, and said housing and base forming a rigid platform;
c. one electrode secured in a said space formed in said post and another electrode secured in said space formed in said side wall;
d. a bell-like conductive member, enclosed by said platform and having a center region, a shaft extending from said center region along said axis through said bore and rotatably supported by said post, and sides flaring outwards therefrom over said post and capable of high-Q radial vibration, said sides disposed between said post and side wall and defining an inner periphery located adjacent one of said electrodes and an outer periphery located adjacent the other of said second electrodes;
e. a first seal disposed between said side wall and said base permitting adjustment therebetween relative to said axis, and a second seal disposed between said shaft and said bore permitting adjustment therebetween relative to said axis, whereby said adjustment may be made while a predetermined atmosphere is contained about said sides by said platform;
f. means operatively connected to said shaft and base for rotating said sides relative to said electrodes and for securing said bell member to said post;
g. first circuit means connected to one of said electrodes and operative to develop a varying potential difference between said electrode and said side to establish therein a vibration pattern defining nodal and anti-nodal regions when the platform does not rotate; and
h. second circuit means connected to the other of said electrodes located at a said nodal region, said second circuit operative to develop signals varying with the radial vibrations of said side produced at a said nodal region thereof by the effects of said vibration pattern and the rotation of said platform about said axis.

9. In an apparatus for detecting motion of a platform about an axis:
a. a base comprised of a floor having an axially extending outer periphery, a post having a bore therethrough along said axis and axially extending openings located about the periphery thereof, said openings facing radially from said axis;
b. a housing composed of an end wall and a side wall located about said axis, said side wall having an inner periphery with an abutment thereon and axially-extending openings therein located about and facing radially towards said axis;
c. means secured to said side wall urging said floor of said base against said abutment of said side wall, permitting adjustment therebetween relative to said axis, and thereafter forming a rigid platform of said base and housing;
d. sealing means disposed between said inner periphery of said side wall and said outer periphery of said floor permitting adjustment therebetween relative to said axis;
e. one electrode secured in a said opening formed in said post and another electrode secured in a said opening in said side wall;
f. a bell-like conductive member enclosed by said platform having a center region, a shaft depending therefrom along said axis located axially by said post and radially by said bore, and side flaring outwards from said center region over said shaft and capable of high-Q radial vibration, said sides disposed between said post and said side wall and defining an inner periphery located adjacent one of said electrodes and an outer periphery located adjacent the other of said electrodes;
g. means operatively connected to said shaft and floor for adjusting said sides relative to said electrodes relative to said axis and for securing said bell member to said post;
h. sealing means disposed between said shaft and said bore permitting adjustment therebetween relative to said axis, whereby a predetermined atmosphere is contained about said sides by said platform;
i. first circuit means connected to one of said electrodes and operative to develop a varying potential difference between said electrode and said side to establish therein a vibration pattern defining nodal and anti-nodal regions when the platform does not rotate;
j. second circuit means connected to the other of said electrodes located at a said nodal region, said second circuit operative to develop signals varying with the radial vibrations of said side produced at a said nodal region thereof by the effects of said vibration pattern and the rotation of said platform about said axis.

10. In a method of manufacturing an apparatus for detecting rotation of a platform about an axis through the vibratory action of a bell-like member having an arcuate periphery of predetermined contour and supported along the axis by the platform:
a. securing at least one conductive guard sleeve in a platform member having walls defining openings therein spaced equi-radially about said axis to receive a said sleeve in at least one opening, said sleeve having an axial portion defining inner and outer walls spaced from said wall opening;
b. securing a rod of electrode material within at least one said guard sleeve, said rod having an axial portion defining an outer wall spaced from said inner wall of said sleeve axial portion;
c. filling said spaces with insulating cement, said platform, sleeves, rods, and cement forming an integral structure; and
d. removing material from the periphery of said platform member, sleeves, rods, and cement in a direction radial to said axis to points on said axial portions of said rods to define electrodes, said axial portions forming substantially the contour of the periphery of the bell-like member so as to receive the same.

* * * * *

PO-1050
(5/69)

UNITED STATES PATENT OFFICE
CERTIFICATE OF CORRECTION

Patent No. __3,678,762__          Dated __July 25, 1972__

Inventor(s) __Richard E. Denis__

It is certified that error appears in the above-identified patent and that said Letters Patent are hereby corrected as shown below:

Patent Column 4, line 69, "the formula h x" should read -- the formula h = --.

Signed and sealed this 9th day of January 1973.

(SEAL)
Attest:

EDWARD M. FLETCHER, JR.          ROBERT GOTTSCHALK
Attesting Officer          Commissioner of Patents